US011880488B2

(12) United States Patent
Chouman et al.

(10) Patent No.: US 11,880,488 B2
(45) Date of Patent: Jan. 23, 2024

(54) FAST AND FLEXIBLE REMEDIATION OF SENSITIVE INFORMATION USING DOCUMENT OBJECT MODEL STRUCTURES

(71) Applicant: Capital One Services, LLC, McLean, VA (US)

(72) Inventors: Andrew Chouman, Northville, MI (US); Dinesan Kottarathil, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 89 days.

(21) Appl. No.: 17/246,389

(22) Filed: Apr. 30, 2021

(65) Prior Publication Data
US 2022/0350919 A1 Nov. 3, 2022

(51) Int. Cl.
*G06F 21/62* (2013.01)

(52) U.S. Cl.
CPC .............................. *G06F 21/6245* (2013.01)

(58) Field of Classification Search
None
See application file for complete search history.

(56) References Cited

U.S. PATENT DOCUMENTS

| | | | | |
|---|---|---|---|---|
| 6,931,532 B1* | 8/2005 | Davis | ................. | G06F 21/6209 |
| | | | | 705/76 |
| 2005/0289358 A1* | 12/2005 | Haselden | ............ | G06F 21/6227 |
| | | | | 713/187 |
| 2006/0117307 A1* | 6/2006 | Averbuch | .............. | G06F 40/221 |
| | | | | 717/143 |
| 2013/0304690 A1* | 11/2013 | Perlmutter | ............... | G06N 5/02 |
| | | | | 706/48 |
| 2016/0140338 A1* | 5/2016 | Walters | ................... | G06F 21/31 |
| | | | | 726/22 |
| 2018/0181556 A1* | 6/2018 | Chang | ................... | G06F 40/186 |

FOREIGN PATENT DOCUMENTS

EP 2642718 A2 * 9/2013 ............. G06F 21/31

* cited by examiner

*Primary Examiner* — Alexander Lagor
*Assistant Examiner* — Felicia Farrow
(74) *Attorney, Agent, or Firm* — Harrity & Harrity, LLP

(57) ABSTRACT

In some implementations, a masking device may receive rules and a document object model (DOM) structure. Each rule may indicate a corresponding element, a corresponding pattern, and a type of remediation. The DOM structure may include elements, where each element is associated with text. The masking device may traverse the DOM structure to identify elements that map to corresponding elements indicated by the rules. The masking device may determine whether text, associated with the identified elements, is sensitive information by determining whether the text maps to corresponding patterns indicated by the rules. The masking device may perform validation on the sensitive information. The masking device may modify the DOM structure based on the sensitive information, the validation, and a type of remediation indicated by the rules. Accordingly, the masking device may output the modified DOM structure.

20 Claims, 7 Drawing Sheets

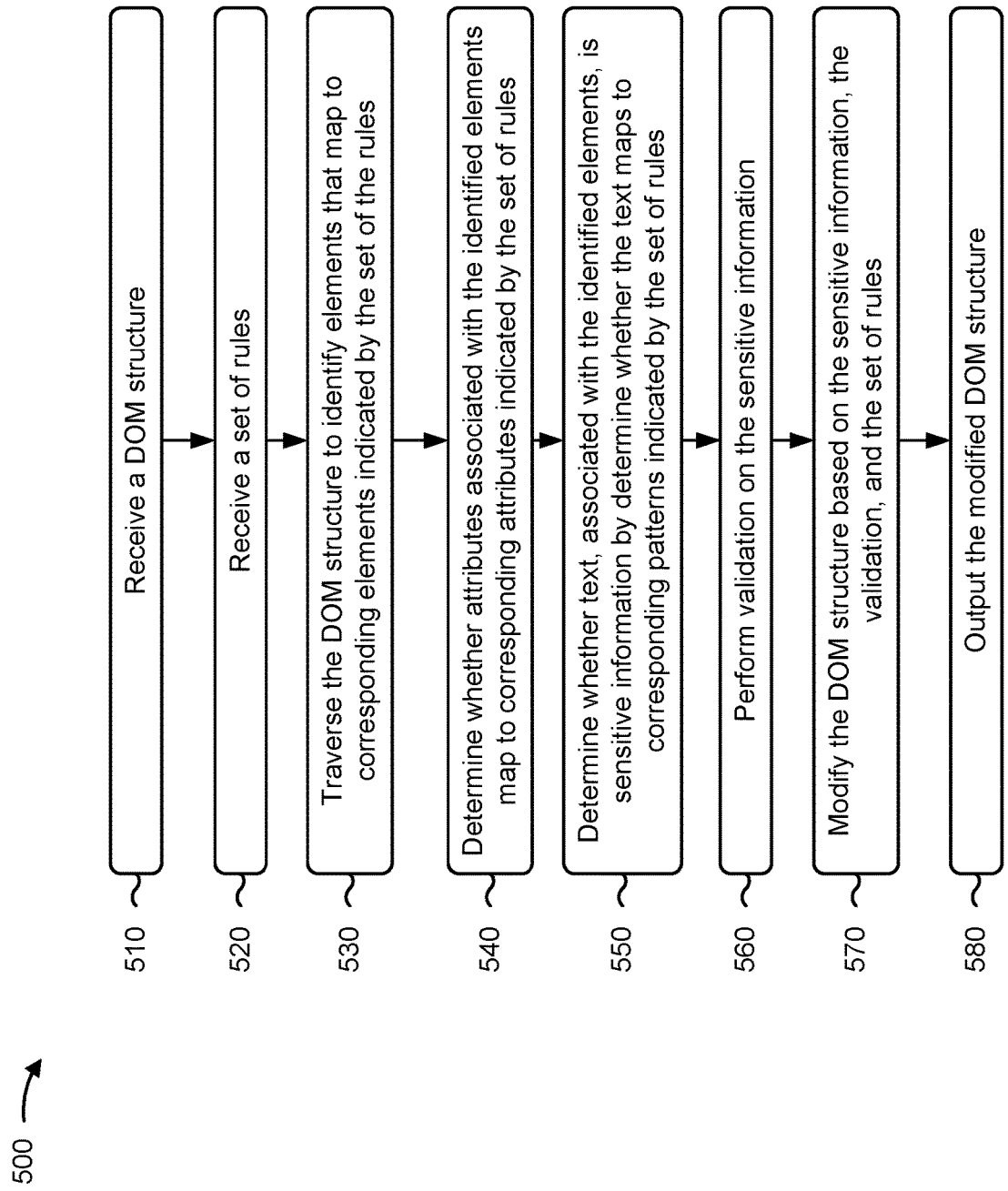

US 11,880,488 B2

FAST AND FLEXIBLE REMEDIATION OF SENSITIVE INFORMATION USING DOCUMENT OBJECT MODEL STRUCTURES

BACKGROUND

Sensitive fields may include personally identifiable information (PII), such as national identification numbers (e.g., social security numbers (SSNs) in the United States, social insurance numbers (SINs) in Canada, SSNs in the Philippines, permanent account numbers (PANs) in India, national insurance numbers (NINOs) in the United Kingdom, employer identification numbers (EINs) in the United States, individual taxpayer identification numbers (ITINs) in the United States, tax identification numbers (TINs) in Costa Rica, and/or other unique or quasi-unique identification numbers), credit card numbers, bank account numbers, passport numbers, and/or other PII. Data that includes sensitive fields should either be encrypted or should be masked, tokenized, or otherwise remediated when stored. Similarly, data that includes sensitive fields should be encrypted or should be masked, tokenized, or otherwise remediated when in transit between devices. For example, a masking system may replace sensitive fields with asterisks or other characters in order to prevent the sensitive fields from being stored. Other remediations may include tokenization (e.g., replacement of sensitive fields with unique or quasi-unique identifiers).

SUMMARY

In some implementations, a system for remediating sensitive information within document object model (DOM) structures includes one or more memories and one or more processors, communicatively coupled to the one or more memories, and configured to receive one or more rules, each rule indicating a corresponding element, a corresponding pattern, a conditional attribute, and a type of remediation; receive at least one DOM structure including at least one element that is associated with text and associated with an attribute; for each rule in the one or more rules: traverse the at least one DOM structure to identify at least one element that maps to a corresponding element indicated by the rule; determine that an attribute, associated with the at least one identified element, maps to a conditional attribute indicated by the rule; determine that at least some text, associated with the at least one identified element, is sensitive information by determining that the at least some text maps to a corresponding pattern indicated by the rule, based on determining that the attribute, associated with the at least one identified element, maps to the conditional attribute indicated by the rule; perform at least one validation on the sensitive information; and modify the at least one DOM structure based on the sensitive information, the at least one validation, and a type of remediation indicated by the rule; and output the at least one modified DOM structure.

In some implementations, a method of remediating sensitive information within DOM structures includes receiving, by a device, one or more rules, each rule indicating a corresponding element, a corresponding pattern, a conditional attribute, and a type of remediation; receiving, by the device, at least one DOM structure including at least one element that is associated with text and associated with an attribute; traversing the at least one DOM structure to identify one or more elements that map to one or more corresponding elements indicated by the one or more rules; determining, by the device, whether one or more attributes, associated with the one or more identified elements, map to one or more conditional attributes indicated by the one or more rules; determining, when the one or more attributes associated with the one or more identified elements map to the one or more conditional attributes indicated by the one or more rules, whether at least some text, associated with the one or more identified elements, is sensitive information by determining whether the at least some text maps to one or more corresponding patterns indicated by the one or more rules; performing, by the device, at least one validation on the sensitive information; and modifying, by the device, the at least one DOM structure based on the sensitive information, the at least one validation, and one or more types of remediation indicated by the one or more rules; and outputting, by the device, the at least one modified DOM structure.

In some implementations, a non-transitory computer-readable medium storing a set of instructions for remediating sensitive information within DOM structures includes one or more instructions that, when executed by one or more processors of a device, cause the device to receive one or more rules, each rule indicating a corresponding element, a corresponding pattern, and a type of remediation; receive at least one DOM structure including at least one element that is associated with text; traverse the at least one DOM structure to identify one or more elements that map to one or more corresponding elements indicated by the one or more rules; determine that at least some text, associated with the one or more identified elements, is sensitive information by determining that the at least some text maps to one or more corresponding patterns indicated by the one or more rules; perform at least one validation on the sensitive information; and modify the at least one DOM structure based on the sensitive information, the at least one validation, and one or more types of remediation indicated by the one or more rules; and output the at least one modified DOM structure.

BRIEF DESCRIPTION OF THE DRAWINGS

FIG. 5 is a flowchart of an example process relating to remediating sensitive information using DOM structures.

DETAILED DESCRIPTION

The following detailed description of example implementations refers to the accompanying drawings. The same reference numbers in different drawings may identify the same or similar elements.

Sensitive fields, such as PII, may be masked, tokenized, encrypted, or otherwise remediated before data that includes those sensitive fields is stored or transmitted for further processing. For example, a system may use non-sensitive portions of the data such that the sensitive fields should be masked, tokenized, encrypted, or otherwise remediated for security. Additionally, or alternatively, a system may lack sufficient encryption (e.g., according to legal rules, such as the Health Insurance Portability and Accountability Act (HIPAA), the General Data Protection Regulation (GDPR), and/or other laws and rules) such that the sensitive fields should be masked or tokenized.

Tools have been developed to automatically remediate sensitive data. These tools may use pattern recognition, machine learning, or other computerized techniques to detect sensitive fields, which are then masked (e.g., by replacing sensitive fields with asterisks or other characters), tokenized, encrypted, or otherwise remediated. However, these tools are generally resource-intensive. For example, neural networks that remediate sensitive data require significant amounts of processing time, memory resources, and power for training the networks as well as using the networks.

Additionally, achieving high accuracy (e.g., masking 90% or more of sensitive data with little to no false positives) with existing tools comes with a trade-off of reduced flexibility. For example, a neural network may be trained to remediate certain types of sensitive data with high accuracy, but that neural network cannot be modified to remediate other types of sensitive data without retraining, which requires significant amounts of processing time, memory resources, and power.

Some implementations described herein use rules applied to document object model (DOM) structures. These rules remediate sensitive data faster than existing computerized models by leveraging DOM structures to quickly traverse the structures and identify the sensitive data. Additionally, some implementations described herein use validation in combination with the rules to achieve high accuracy with significantly less processing time, memory resources, and power than existing computerized models, especially neural networks. Finally, the rules described herein are flexible and can be modified by a user to identify different types of sensitive data. Accordingly, some implementations described herein can be used on other kinds of sensitive data without retraining, which conserves significant amounts of processing time, memory resources, and power.

Figure 1A:
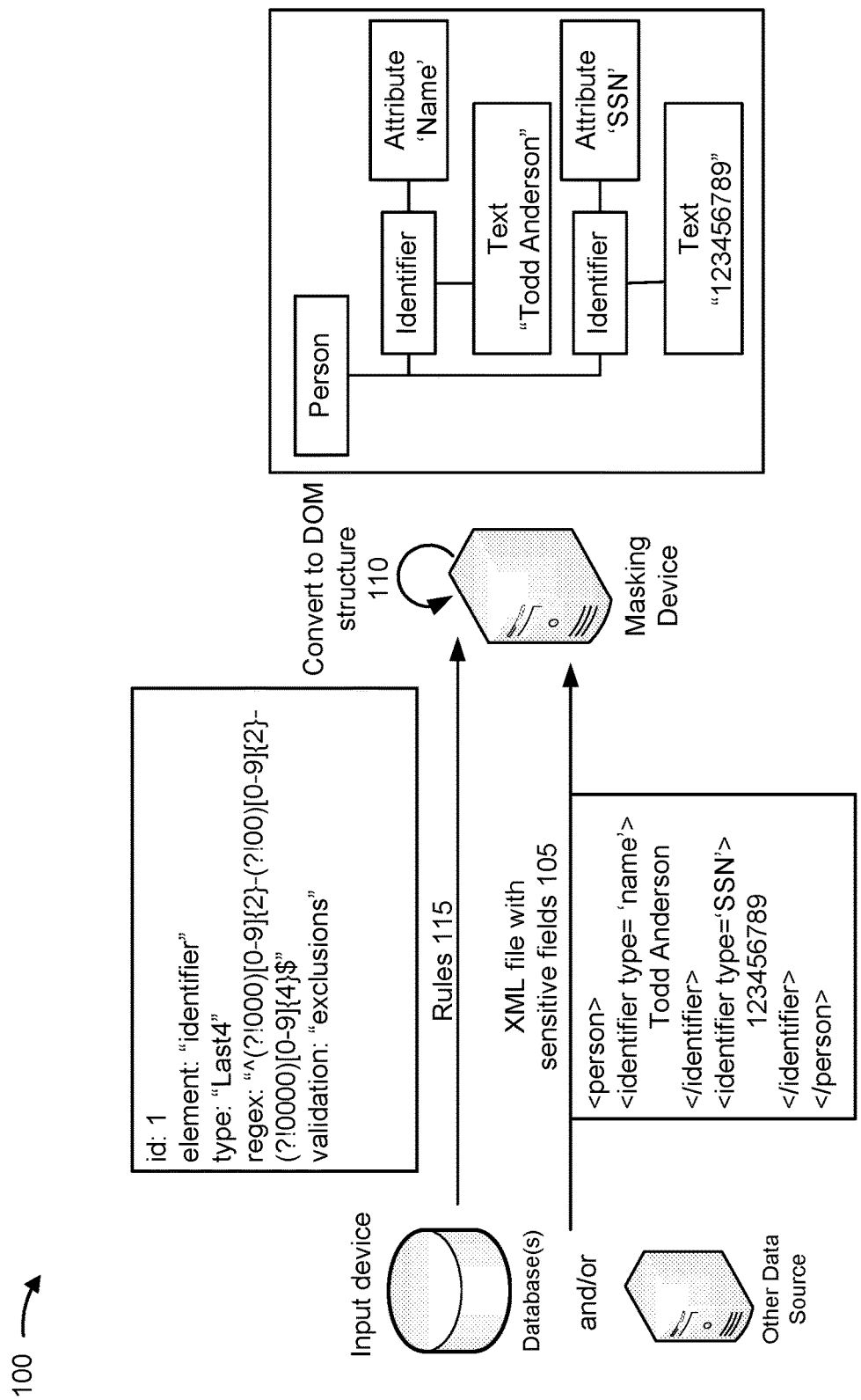
FIGS. 1A, 1B, and 1C are diagrams of an example implementation relating to remediating sensitive information using document object model (DOM) structures.
Figure 1B:
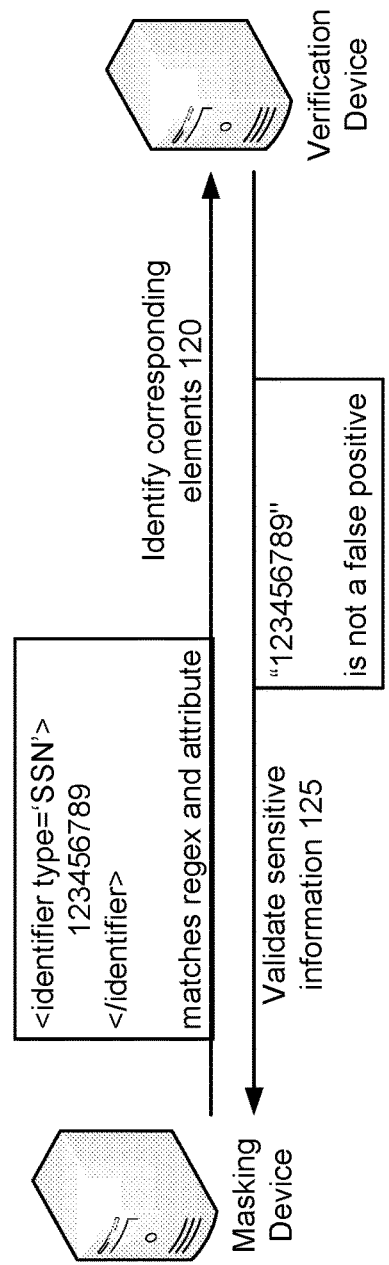
Figure 1C:
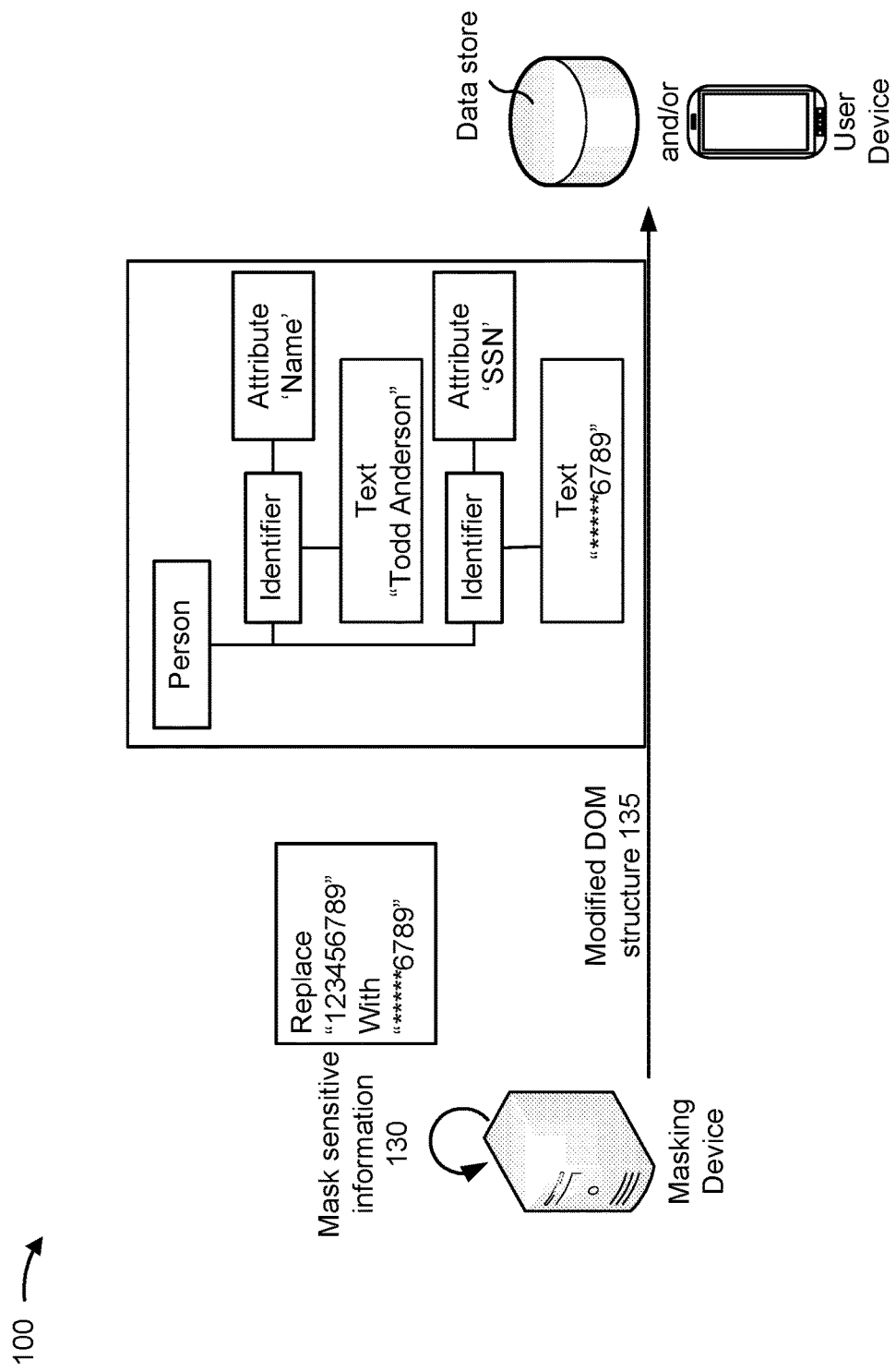

FIGS. 1A-1C are diagrams of an example 100 associated with remediating sensitive information using DOM structures. As shown in FIGS. 1A-1C, example 100 includes an input device (or other data source), a masking device, a verification device, and a data store (or user device). These devices are described in more detail in connection with FIGS. 3 and 4.

As shown in FIG. 1A and by reference number 105, the masking device may receive, from the input device, an extensible markup language (XML) file (e.g., at least one XML, file). In some implementations, the masking device may receive the XML file based on a request from a server or other computing device that uses the masking device to modify information included in the XML file, by masking or otherwise remediating sensitive data, before receiving and processing the remediated information. In another example, the masking device may receive the XML file based on a request from the data store or other storage device that uses the masking device to modify information included in the XML file, by masking or otherwise remediating sensitive data, before storing the remediated information. In another example, the masking device may receive the XML file based on a request from the user device that uses the masking device to modify information included in the XML file, by masking or otherwise remediating sensitive data, before receiving and displaying the remediated information.

The XML file may include one or more elements. In example 100, the XML file includes a "person" element. In some implementations, elements may be nested. In example 100, the XML, file includes two "identifier" elements nested within the "person" element. Each element may include associated text. In example 100, the first "identifier" element includes "Todd Anderson" as text and the second "identifier" element includes "123456789" as text. In some implementations, an element may include one or more associated attributes. In example 100, each "identifier" element includes an associated "type" attribute. The attribute(s) may include associated text. In example 100, the "type" attribute for the first "identifier" element is associated with "name" as text, and the "type" attribute for the second "identifier" element is associated with "SSN" as text.

As shown by reference number 110, the masking device may generate a DOM structure (e.g., at least one DOM structure) based on the XML file. For example, the masking device may execute an XML parser application to parse the XML file and generate the DOM structure.

In some implementations, the masking device may receive the DOM structure directly rather than receiving an XML file and generating the DOM structure based on the XML file. For example, the masking device may receive the DOM structure from the input device similarly to receiving the XML file, as described above.

The DOM structure may include elements (e.g., at least one element). In example 100, the DOM structure includes a "person" element. In some implementations, elements may be nested. In example 100, the DOM structure includes two "identifier" elements nested within the "person" element. Each element may be associated with text. In example 100, the first "identifier" element is associated with "Todd Anderson" as text and the second "identifier" element is associated with "123456789" as text. In some implementations, an element (e.g., at least one element) of the DOM structure may further be associated with an attribute. In example 100, each "identifier" element is associated with a "type" attribute. The attribute(s) may include text. In example 100, the "type" attribute associated with the first "identifier" element includes "name" as text, and the "type" attribute associated with the first "identifier" element includes "SSN" as text. The elements (along with any attributes and/or text) may be organized in a tree structure, as shown in FIG. 1A.

As shown by reference number 115, the masking device may receive, from the input device, rules (e.g., one or more rules). In some implementations, the rules may be included in additional XML files (e.g., one or more XML files). The masking device may receive the rules from the same input device as providing the XML file or from a different input device. For example, one input device may provide the rules for the masking device to use on the XML file that is received from a different input device.

In some implementations, the masking device may receive the rules based on a request from a server or other computing device that uses the masking device before receiving and processing the remediated information (e.g., as described above). In another example, the masking device may receive the rules based on a request from the data store or other storage device that uses the masking device before storing the remediated information (e.g., as described above). In another example, the masking device may receive the rules based on a request from the user device that uses the masking device before receiving and displaying the remediated information (e.g., as described above).

Each rule may indicate a corresponding element. In example 100, the rule indicates a corresponding "identifier" element. Accordingly, the masking device may use the rule to identify any "identifier" elements within the DOM structure (e.g., as described below in connection with reference number 120). In some implementations, the masking device may only search for sensitive information (e.g., as described below) included in text associated with one or more elements in the DOM structure that match a corresponding element in a rule. As used herein, "match" may refer to a true match (e.g., such that a match is determined based on a correspondence of all characters) or a fuzzy match (e.g., such that a match is determined based on a threshold quantity, percentage, or fraction of characters corresponding; based on a similarity score output by a model satisfying a threshold; and/or based on a context-aware model outputting a Boolean or other score indicating a match). Accordingly, in example 100, the masking device may only search for sensitive information included in text associated with "identifier" elements.

Each rule may further indicate a corresponding pattern. For example, the corresponding pattern may be a regular expression. In example 100, the rule indicates a "^(?!000)[0-9]{3}-(?!00)[0-9]{2}-(?!0000)[0-9]{4}$" pattern. Accordingly, the masking device may apply the pattern to text within the DOM structure to identify sensitive information. The pattern of example 100 identifies social security numbers formatted as ###-##-####that do not include "000" in the first portion, "00" in the second portion, or "0000" in the third portion. In some implementations, the masking device may only apply the pattern to text associated with one or more elements in the DOM structure that match a corresponding element in the rule (e.g., as described above). Accordingly, in example 100, the masking device may only apply the corresponding pattern to text associated with "identifier" elements.

In some implementations, each rule may indicate a type of remediation. In example 100, the rule indicates a "Last4" remediation, such that the masking device will replace the last four digits of a portion of identified sensitive information unchanged and replace other digits in the portion with an asterisk, a pound sign, and/or another character. Each "portion" of identified sensitive information may include a group of characters that matches the corresponding pattern indicated in the rule. For example, the corresponding pattern may indicate an SSN, such that each "portion" of identified sensitive information corresponds to one SSN. In another example, the corresponding pattern may indicate an EIN, such that each "portion" of identified sensitive information corresponds to one EIN. Another type of remediation may include replacing all or another fraction of digits within a portion of identified sensitive information with an asterisk, a pound sign, and/or another character. Additionally, or alternatively, another type of remediation may include replacing all or a fraction of characters within a portion of identified sensitive information with an asterisk, a pound sign, and/or another character. Additionally, or alternatively, another type of remediation may include replacing a portion of identified sensitive information with a string (e.g., the rule may indicate the string for the masking device to use to replace each portion of identified sensitive information). Other types of remediation may include tokenization techniques and/or encryption techniques.

In some implementations, a rule may additionally or alternatively indicate a conditional attribute. In some implementations, the masking device may only search for sensitive information (e.g., as described above) included in text associated with one or more elements in the DOM structure that both match a corresponding element indicated in the rule and are associated with the conditional attribute indicated in the rule. For example, the rule may indicate an "identifier" element and a "type" attribute such that the masking device applies the pattern to text associated with "identifier" elements that are associated with a "type" attribute. In some implementations, the rule may additionally indicate a conditional value (e.g., one or more values) for the conditional attribute. Accordingly, the masking device may only search for sensitive information (e.g., as described above) included in text associated with one or more elements in the DOM structure that match a corresponding element indicated in the rule, that are associated with an attribute that matches the conditional attribute indicated in the rule, and that are associated with a matching attribute that includes a value matching the conditional value indicated in the rule. For example, the rule may indicate an "identifier" element, a "type" attribute, and an "SSN" value such that the masking device applies the pattern to text associated with "identifier" elements that are associated with a "type" attribute that includes an "SSN" value.

Additionally, or alternatively, the masking device may search for sensitive information (e.g., as described above) included in additional text that is included in an attribute in the DOM structure that matches a corresponding attribute indicated in the rule. For example, the rule may indicate an "identifier" element and a "type" attribute such that the masking device applies the corresponding pattern in the rule to text included in "type" attributes in addition to text associated with "identifier" elements. The masking device may apply the corresponding pattern to text included in all attributes, included in the DOM structure, that match the corresponding attribute in the rule, or only to attributes that match the corresponding attribute in the rule and are associated with elements, in the DOM structure, that match the corresponding element in the rule. For example, the masking device may apply the corresponding pattern to text included in all "type" attributes included in the DOM structure or only to "type" attributes associated with "identifier" elements in the DOM structure.

Each rule may further be associated with an identifier (e.g., shown as a value of "1" for the "id" in example 100). For example, the masking device may order a plurality of rules (e.g., for looping through the rules as described below in connection with reference number 120) based on the identifiers (e.g., according to ordinal positions corresponding to numerical identifiers and/or according to alphabetical positions corresponding to alphanumeric identifiers).

As shown in FIG. 1B and by reference number 120, the masking device may identify elements (e.g., at least one element) in the DOM structure that includes sensitive information. In some implementations, the masking device may traverse the DOM structure to identify the elements that map to corresponding elements (e.g., one or more corresponding elements) indicated by the rules. For example, the masking device may determine which elements within the DOM structure match the corresponding elements indicated by the rules. Thus, in example 100, the masking device has identified an "identifier" element within the DOM structure. The masking device may further determine that text (e.g., at least some text), associated with the identified elements, includes sensitive information by determining that the text maps to corresponding patterns (e.g., one or more corresponding patterns) indicated by the rules. For example, the masking device may apply the corresponding patterns to the text to identify portions (e.g., one or more portions) of sensitive information included in the text. Thus, in example 100, the masking device has identified text ("123456789") within an "identifier" element as including sensitive information.

In some implementations, the masking device may further determine that attributes (e.g., one or more attributes) associated with the identified elements map to corresponding attributes (e.g., one or more corresponding attributes) indicated by the rules. For example, the masking device may determine which of the identified elements, within the DOM structure, are associated with attributes that match corresponding attributes indicated by the rules.

In some implementations, the masking device may further determine that additional text (e.g., at least some additional text), included in the determined attributes, includes sensitive information by determining that the additional text maps to the corresponding patterns indicated by the rules. For example, the masking device may apply the corresponding patterns to the additional text to identify portions (e.g., one or more portions) of sensitive information included in the additional text.

Additionally, or alternatively, the masking device may further determine that attributes (e.g., one or more attributes) associated with the identified elements map to conditional attributes (e.g., one or more conditional attributes) indicated by the rules. For example, the masking device may determine which of the identified elements, within the DOM structure, are associated with attributes that match conditional attributes indicated by the rules. In example 100, the rules may indicate a "type" attribute such that the masking device has identified an "identifier" element, within the DOM structure, that is associated with a "type" attribute. In some aspects, the masking device may further determine that values (e.g., one or more values), associated with the determined attributes, map to conditional values (e.g., one or more conditional values) associated with the conditional attributes indicated by the rules. For example, the masking device may determine which of the identified elements, within the DOM structure, are associated with attributes that have associated values that match conditional values indicated by the rules. For example, the rules may indicate an "SSN" value for the "type" attribute in example 100 such that the masking device has identified an "identifier" element, within the DOM structure, that is associated with a "type" attribute that includes the "SSN" value.

In some implementations, the masking device may traverse through the DOM structure per rule. For example, the masking device may identify first sensitive information in the DOM structure using a first rule, then identify second sensitive information in the DOM structure using a second rule, and so on. As an alternative, the masking device may traverse through the DOM structure per element. For example, the masking device may use the rules to determine whether sensitive information is included in text that is associated with a first element and/or in additional text that is included in an attribute associated with the first element, then use the rules to determine whether sensitive information is included in text that is associated with a second element and/or in additional text that is included in an attribute associated with the second element, and so on.

Regardless of which traversing technique is used, the use of corresponding elements and corresponding patterns (and, in some implementations, corresponding attributes, conditional attributes and/or conditional values) in the rules, as described above, results in a much faster identification of sensitive information by the masking device than is provided by existing techniques, such as neural networks, linear regression models, and/or other similar computerized models. For example, by leveraging the DOM structure such that the masking device only searches text included in identified elements and/or attributes, the masking device can perform pattern matching much faster than existing techniques.

In some implementations, the masking device may additionally apply surrounding node scans (e.g., at least one surrounding node scan) based on the identified elements. For example, the masking device may identify an additional element (e.g., at least one additional element) within a threshold distance of one of the identified elements. The threshold distance may include a threshold quantity (e.g., at least one quantity) of intervening elements between one of the identified elements and the additional element. The masking device may apply different threshold quantities depending on whether one of the identified elements and the additional element are nested within a same parent element (e.g., both "identifier" elements are nested within the same "person" element, which is thus the parent element, in example 100) or not. Additionally, or alternatively, the threshold distance may be dynamic such that the additional elements must be nested within the same parent element as one of the identified elements.

The masking device may identify additional sensitive information, based on the surrounding node scans, in a manner similar to identifying sensitive information for the identified elements as described above. For example, the masking device may further determine that text (e.g., at least some text), associated with the additional element, includes additional sensitive information by determining that the text maps to corresponding patterns (e.g., one or more corresponding patterns) indicated by the rules. The masking device may apply the corresponding patterns to the text to identify portions (e.g., one or more portions) of sensitive information included in the text.

In some implementations, the masking device may further determine that an additional attribute (e.g., one or more additional attributes) associated with the additional element, identified in a surrounding node scan, maps to a conditional attribute (e.g., one or more conditional attributes) indicated by the rules. For example, the masking device may determine that the additional element, within the DOM structure, is associated with an additional attribute that matches a conditional attribute indicated by the rules. Accordingly, the masking device may identify the additional sensitive information based on the additional attribute associated with the additional element, identified in a surrounding node scan, mapping to the conditional attribute. In some aspects, the masking device may further determine that a value (e.g., one or more values), associated with the additional attribute, maps to a conditional value (e.g., one or more conditional values) associated with the conditional attribute indicated by the rules. For example, the masking device may determine that the additional element is associated with an additional attribute that has an associated value that matches a conditional value indicated by the rules. Accordingly, the masking device may identify the additional sensitive information based on the additional attribute associated with the additional element, identified in a surrounding node scan, including a value that maps to the conditional value.

Additionally, or alternatively, the masking device may determine that an additional attribute (e.g., one or more additional attributes) associated with the additional element, identified in a surrounding node scan, maps to a corresponding attribute (e.g., one or more corresponding attributes) indicated by the rules. For example, the masking device may determine that the additional element, within the DOM structure, is associated with an additional attribute that matches a corresponding attribute indicated by the rules. Thus, the masking device may determine that additional text (e.g., at least some additional text), included in the additional attribute, includes sensitive information by determining that the additional text maps to the corresponding patterns indicated by the rules. For example, the masking device may apply the corresponding patterns to the additional text to identify portions (e.g., one or more portions) of sensitive information included in the additional text.

By using surrounding node scans in combination with the rules, as described above, the masking device may identify sensitive information with a level of accuracy that is comparable to the levels provided by existing techniques, such as neural networks, pattern matching, and/or other similar computerized models. For example, the surrounding node scans can significantly reduce false negatives but do not use large amounts of processing or memory resources like neural network training, using sliding windows for pattern matching, and/or other existing techniques to reduce false negatives.

As shown by reference number 125, the verification device may perform a validation (e.g., at least one validation) on the sensitive information. The verification device may be at least partially separate (e.g., physically, operatively, and/or logically) from the masking device, as shown in FIG. 1B. As an alternative, the verification device may be integrated with the masking device (e.g., included on the same physical server or server farm, contained in the same software program, and/or implemented in the same cloud environment). The verification device may determine which portions of the sensitive information are false positives based on the validation.

The verification device may perform a length check, a Luhn algorithm check, an exclusions list check, an identification number check (e.g., a bank identification number (BIN) check), and/or another verification technique (e.g., to detect false positives). A length check may catch false positives that are portions of a longer string. For example, the verification device may check that text identified as a credit card number has 15 or 16 digits and is not a portion of a longer string. In another example, the verification device may check that text identified as an SSN has 9 digits and is not a portion of a longer string. A Luhn algorithm check may validate identified text against an expected check digit included therein. For example, the verification device may use a Luhn algorithm to exclude text identified as a credit card number or a SIN that is not a valid credit card number or SIN, respectively. An exclusions list check may validate identified text against disallowed values. For example, the verification device may check that text identified as an SSN does not start with "000," "666," "9," and/or other disallowed digits. In another example, the verification device may check that text identified as an SIN does not have a disallowed value of 123-456-789. A BIN check may validate identified text against expected lead digits included therein. For example, the verification device may check that text identified as a credit card number has a valid BIN (e.g., a valid major industry identifier (MII) and/or issuer identification number (IIN)) in the leading four, five, or six digits. In another example, the verification device may check that text identified as an EIN has a valid two-digit prefix. Other verification techniques may detect other false positives using different validations.

The portions of the sensitive information may be from identified elements and/or attributes (e.g., as described above). In some implementations, the verification device may further perform a validation (e.g., at least one validation) on additional sensitive information from surrounding node scans (e.g., as described above).

In some implementations, the verification device may select from different validations based on validations indicated in the rules. For example, a first portion of the sensitive information and/or of the additional sensitive information may have been identified using a first rule that indicates a first validation, a second portion of the sensitive information and/or of the additional sensitive information may have been identified using a second rule that indicates a second validation, and so on. Accordingly, the verification device may perform the first validation on the first portion, the second validation on the second portion, and so on. In example 100, the rule indicates an "exclusions" validation, so the verification device will apply an exclusions list check to portions of the sensitive information and/or of the additional sensitive information that were identified based on the rule.

The verification device may indicate which portions of the sensitive information and/or of the additional sensitive information are not false positives, as shown in FIG. 1B. Additionally, the verification device may also indicate which portions of the sensitive information and/or of the additional sensitive information are false positives. For example, the verification device may determine that a first portion of the sensitive information and/or of the additional sensitive information is a false positive. The first portion may fail a length check, a Luhn algorithm check, an exclusions list check, or a BIN check. Accordingly, the verification device may indicate to the masking device that the false positive should not be modified (e.g., as described below in connection with reference number 130).

By using verifications described above in combination with the rules, the masking device may identify sensitive information with a level of accuracy that is comparable to the levels provided by existing techniques, such as neural networks, pattern matching, and/or other similar computerized models. For example, the surrounding node scans can significantly reduce false positives but do not use large amounts of processing or memory resources like neural network training, using sliding windows for pattern matching, and/or other existing techniques to reduce false positives.

As shown in FIG. 1C and by reference number 130, the masking device may modify the DOM structure based on the sensitive information (and/or the additional sensitive information) and the validation. For example, the masking device may modify portions of the sensitive information (and/or the additional sensitive information) that were validated by the validation device and refrain from modifying portions of the sensitive information (and/or the additional sensitive information) that were indicated as false positives by the validation device.

In some implementations, the masking device may further modify the DOM structure based on the type of remediation (e.g., one or more types of remediation) indicated by the rules. For example, the type of remediation may include replacement of sensitive information with a stored string, replacement of one or more digits included in sensitive information (e.g., all but a last four digits, all but a first six digits, and/or another pattern) with a stored character (e.g., an asterisk, a pound symbol, and/or another character), and/or replacement of one or more characters included in sensitive information (e.g., all characters except dashes, periods, spaces, and/or other demarcations) with the stored character. Additionally, or alternatively, the type of remediation may include a type of tokenization and/or a type of encryption.

In some implementations, the masking device may select from different types of remediation based on types of remediation indicated in the rules. For example, a first portion of the sensitive information and/or of the additional sensitive information may have been identified using a first rule that indicates a first type of remediation, a second portion of the sensitive information and/or of the additional sensitive information may have been identified using a second rule that indicates a second type of remediation, and so on. Accordingly, the masking device may perform the first type of remediation on the first portion, the second type of remediation on the second portion, and so on. In example 100, the rule indicates a "Last4" type of remediation, so the masking device will replace all digits except the last four with a stored character (an asterisk in example 100).

As shown by reference number 135, the masking device may output the modified DOM structure to a data store. In some implementations, the masking device may output the modified DOM structure such that the data store can securely store the modified DOM structure. In another example, the masking device may store the modified DOM structure in a memory (e.g., included in the data store) such that a server or other computing device can retrieve the modified DOM structure from the memory and securely process information included in the modified DOM structure. In another example, the masking device may transmit the modified DOM structure to a device (e.g., the user device) such that the device can securely display information included in the modified DOM structure.

In some implementations, the masking device may generate an XML file (e.g., at least one XML file) based on the modified DOM structure and output the XML file in addition to or in lieu of the modified DOM structure. For example, the masking device may output the generated XML file such that the data store can securely store the generated XML file. In another example, the masking device may store the generated XML file in a memory (e.g., included in the data store) such that a server or other computing device can retrieve the generated XML file from the memory and securely process information included in the generated XML file. In another example, the masking device may transmit the generated XML file to a device (e.g., the user device) such that the device can securely display information included in the generated XML file.

In some implementations, the masking device may additionally output a response (e.g., at least one file) including a summary of modifications associated with the sensitive information. For example, the response may include a log file and/or another similar type of file. The response may indicate which portions of sensitive text were modified and how (e.g., indicating which type of remediation was applied). In some implementations, each modification is associated with a rule of the one or more rules that triggered the modification.

The masking device of FIGS. 1A-1C may thus apply the rules to the DOM structure, which results in masking the sensitive information faster than existing computerized models, such as neural networks, by leveraging DOM structures to quickly traverse the structures and identify the sensitive information. Additionally, the validation device of FIGS. 1A-1C may cooperate with the masking device to achieve high accuracy with significantly less processing time, memory resources, and power than existing computerized models, especially neural networks. Finally, the rules received by the masking device are flexible and can be modified by a user (e.g., by modifying the XML file(s) including the rules) to identify different types of sensitive information. Accordingly, the masking device can be readily re-configured to identify and remediate other kinds of sensitive information without retraining, which conserves significant amounts of processing time, memory resources, and power.

As indicated above, FIGS. 1A-1C are provided as an example. Other examples may differ from what is described with regard to FIGS. 1A-1C.

Figure 2:
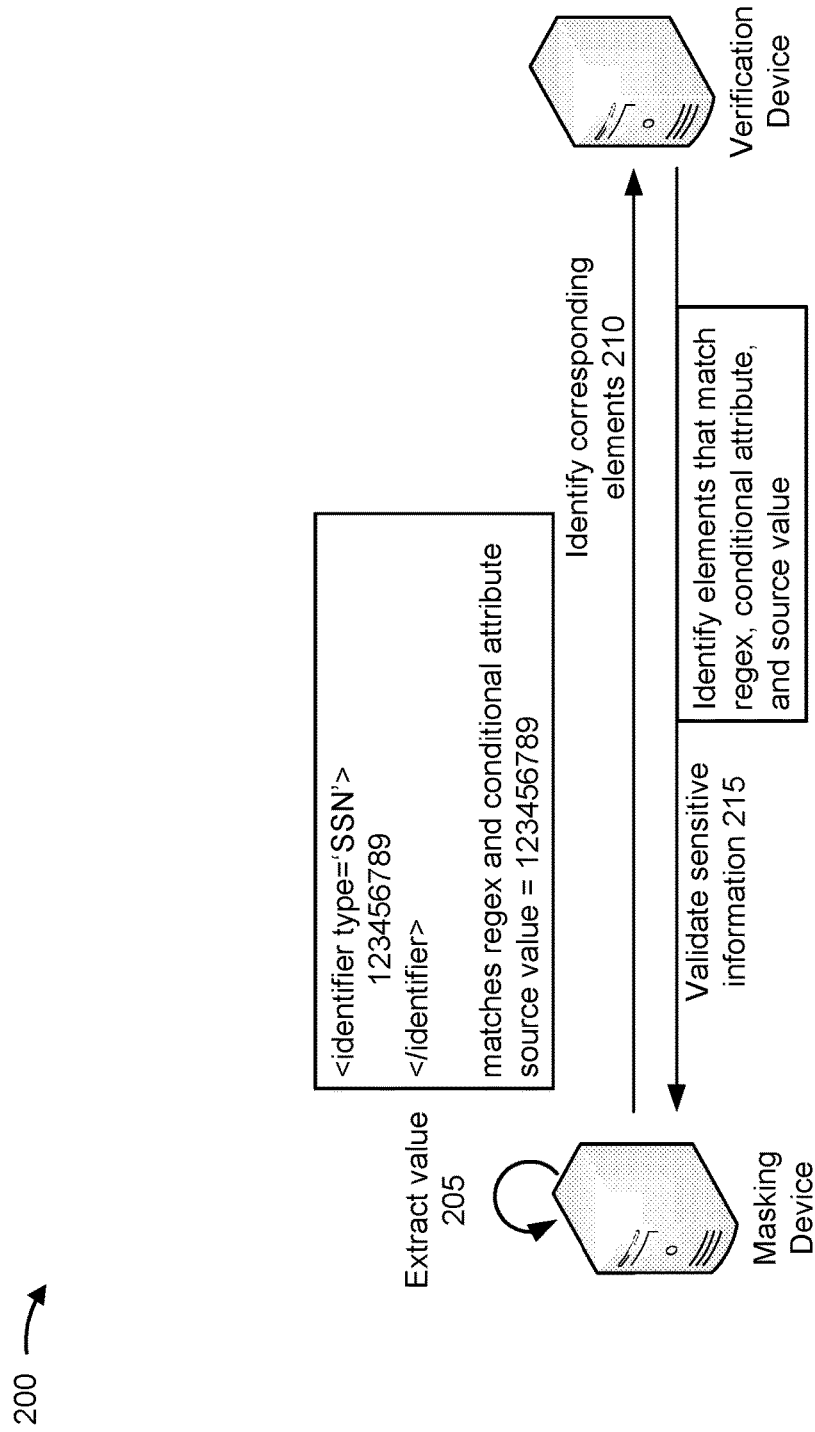
FIG. 2 is a diagram of an example implementation relating to remediating sensitive information using DOM structures and source values.

FIG. 2 is a diagram of an example 200 associated with remediating sensitive information using DOM structures and source values. As shown in FIG. 2, example 200 includes a masking device and a validation device. These devices are described in more detail in connection with FIGS. 3 and 4.

The masking device may have received a DOM structure (or generated a DOM structure based on a received XML file) and rules for identifying sensitive information, as described above in connection with reference numbers 105, 110, and/or 115 of FIG. 1A. Accordingly, the masking device may identify a first element in the DOM structure that includes sensitive information. In some implementations, the masking device may traverse the DOM structure to identify the first element that maps to a corresponding element (e.g., one or more corresponding elements) indicated by the rules. Thus, in example 200, the masking device has identified an "identifier" element within the DOM structure. The masking device may further determine that text (e.g., at least some text), associated with the first identified element, includes sensitive information by determining that the text maps to a corresponding pattern (e.g., one or more corresponding patterns) indicated by the rules. For example, the masking device may apply the corresponding pattern to the text to identify portions (e.g., one or more portions) of sensitive information included in the text. Thus, in example 200, the masking device has identified text ("123456789") within an "identifier" element as including sensitive information.

In some implementations, the masking device may further determine that an attribute (e.g., one or more attributes) associated with the first identified element maps to a corresponding attribute (e.g., one or more corresponding attributes) indicated by the rules. For example, the masking device may determine that the first identified element, within the DOM structure, is associated with an attribute that matches the corresponding attribute indicated by the rules.

In some implementations, the masking device may further determine that additional text (e.g., at least some additional text), included in the determined attribute, includes sensitive information by determining that the additional text maps to the corresponding pattern indicated by the rules. For example, the masking device may apply the corresponding pattern to the additional text to identify portions (e.g., one or more portions) of sensitive information included in the additional text.

Additionally, or alternatively, the masking device may further determine that attributes (e.g., one or more attributes) associated with the identified elements map to conditional attributes (e.g., one or more conditional attributes) indicated by the rules. For example, the masking device may determine which of the identified elements, within the DOM structure, are associated with attributes that match conditional attributes indicated by the rules. In example 200, the rules may indicate a "type" attribute such that the masking device has identified an "identifier" element, within the DOM structure, that is associated with a "type" attribute. In some aspects, the masking device may further determine that a value (e.g., one or more values), associated with the determined attribute, maps to a conditional value (e.g., one or more conditional values) associated with the conditional attribute indicated by the rules. For example, the masking device may determine that the first identified element, within the DOM structure, is associated with an attribute that has an associated value that matches the conditional value indicated by the rules. For example, the rules may indicate an "SSN" value for the "type" attribute in example 200 such that the masking device has identified an "identifier" element, within the DOM structure, that is associated with a "type" attribute that includes the "SSN" value.

As shown by reference number 205, the masking device may extract a value from the sensitive information associated with the first identified element. For example, the masking device may extract a portion of sensitive information (e.g., from the text associated with the first identified element and/or from the additional text included in the determined attribute that is associated with the first identified element) that matches a corresponding pattern indicated by the rules. In example 200, the masking device has extracted "123456789" as the value from the first identified element. The extracted value may also be referred to as a "source value."

As shown by reference number 210, the masking device may further identify additional elements (e.g., at least one second element) in the DOM structure that includes additional sensitive information. In some implementations, the masking device may traverse the DOM structure to identify the additional elements that map to corresponding elements (e.g., one or more corresponding elements) indicated by the rules. For example, the masking device may determine which additional elements within the DOM structure match the corresponding elements indicated by the rules. Thus, in example 200, the masking device may identify additional "identifier" elements within the DOM structure. The masking device may further determine that text (e.g., at least some text), associated with the additional identified elements, includes additional sensitive information by determining that the text maps to corresponding patterns (e.g., one or more corresponding patterns) indicated by the rules. For example, the masking device may apply the corresponding patterns to the text to identify portions (e.g., one or more portions) of additional sensitive information included in the text.

In some implementations, the masking device may further determine that attributes (e.g., one or more attributes) associated with the additional identified elements map to corresponding attributes (e.g., one or more corresponding attributes) indicated by the rules. For example, the masking device may determine which of the additional identified elements, within the DOM structure, are associated with attributes that match corresponding attributes indicated by the rules.

In some implementations, the masking device may further determine that additional text (e.g., at least some additional text), included in the determined attributes, includes additional sensitive information by determining that the additional text maps to the corresponding patterns indicated by the rules. For example, the masking device may apply the corresponding patterns to the additional text to identify portions (e.g., one or more portions) of additional sensitive information included in the additional text.

Additionally or alternatively, the masking device may further determine that attributes (e.g., one or more attributes) associated with the identified elements map to conditional attributes (e.g., one or more conditional attributes) indicated by the rules. For example, the masking device may determine which of the identified elements, within the DOM structure, are associated with attributes that match conditional attributes indicated by the rules. In example 200, the rules may indicate a "type" attribute such that the masking device has identified an "identifier" element, within the DOM structure, that is associated with a "type" attribute. In some aspects, the masking device may further determine that values (e.g., one or more values), associated with the determined attributes, map to conditional values (e.g., one or more conditional values) associated with the conditional attributes indicated by the rules. For example, the masking device may determine which of the additional identified elements, within the DOM structure, are associated with attributes that have associated values that match conditional values indicated by the rules. For example, the rules may indicate an "SSN" value for the "type" attribute in example 200 such that the masking device identifies additional "identifier" elements, within the DOM structure, that are associated with "type" attributes that include the "SSN" value.

As shown by reference number 215, the verification device may validate the additional sensitive information based on the source value. For example, the verification device may determine that the text associated with the additional identified elements (e.g., one or more second identified elements) and/or the additional text included in attributes associated with the additional identified elements is additional sensitive information based on the extracted value. For example, the verification device may determine that the text and/or the additional text matches the source value. Accordingly, the verification may indicate which portions of the additional sensitive information are not false positives. Additionally, the verification device may also indicate which portions of the additional sensitive information are false positives. For example, the verification device may determine that some of the text and/or the additional text is a false positive. Accordingly, the verification device may indicate to the masking device that the false positive should not be modified (e.g., as described above in connection with reference number 130 of FIG. 1C). Accordingly, the masking device may proceed to modify the DOM structure and generate output based on the modified DOM structure as described above in connection with reference numbers 130 and/or 135 of FIG. 1C.

By using a source value described above in combination with the rules, the masking device may identify sensitive information with a level of accuracy that is comparable to the levels provided by existing techniques, such as neural networks, pattern matching, and/or other similar computerized models. For example, the masking device can use a source value to significantly reduce false positives but without using large amounts of processing or memory resources like neural network training, using sliding windows for pattern matching, and/or other existing techniques to reduce false positives.

As indicated above, FIG. 2 is provided as an example. Other examples may differ from what is described with regard to FIG. 2.

Figure 3:
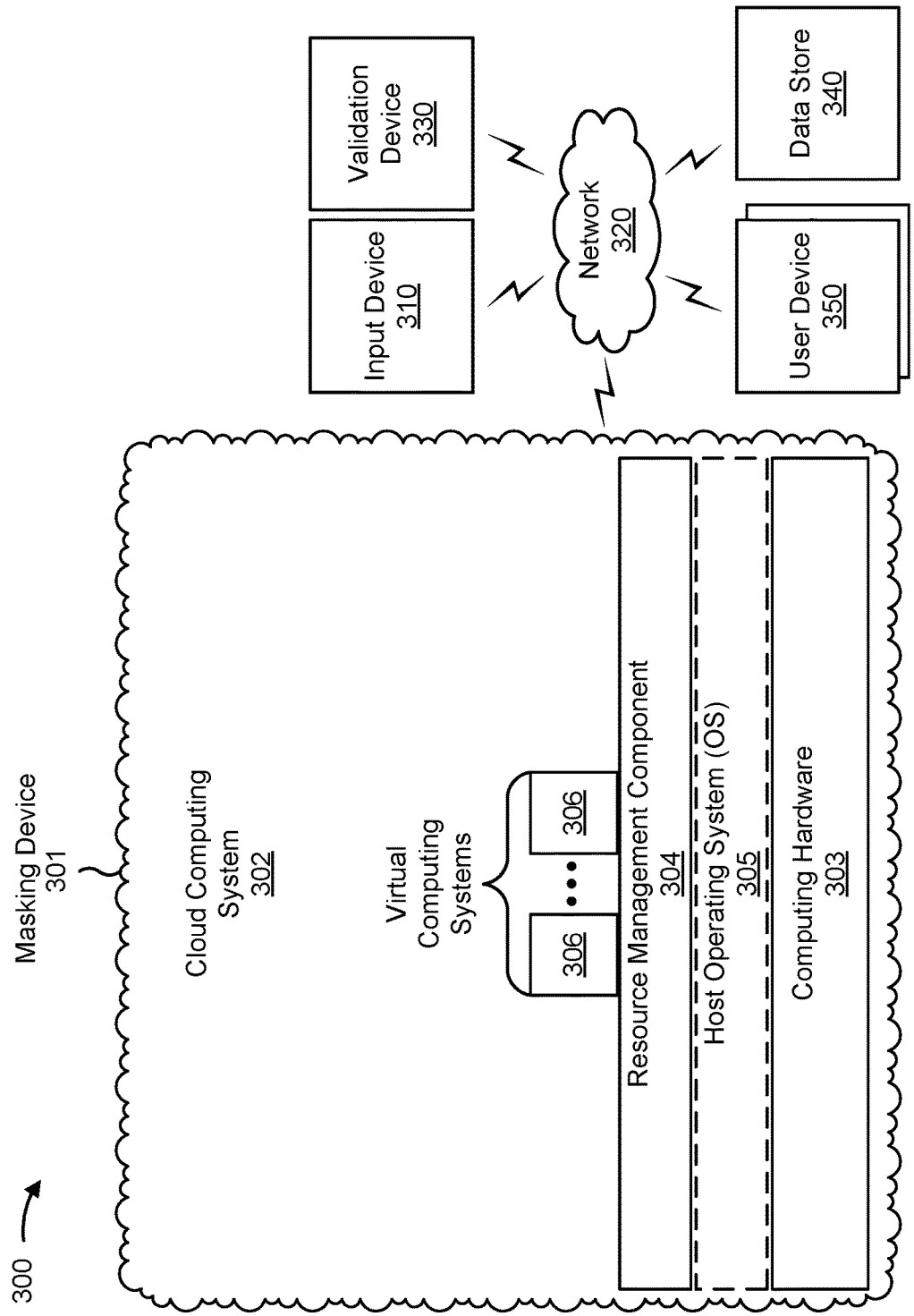
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a masking device 301, which may include one or more elements of and/or may execute within a cloud computing system 302. The cloud computing system 302 may include one or more elements 303-306, as described in more detail below. As further shown in FIG. 3, environment 300 may include an input device 310, a network 320, a validation device 330, a data store 340, and/or a user device 350. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. Computer hardware 303 may include one or more processors, one or more memories, one or more storage components, and/or one or more networking components, examples of which are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines. Additionally, or alternatively, the resource management component 304 may include a container manager, such as when the virtual computing systems 306 are containers. In some implementations, the resource management component 304 executes within and/or in coordination with a host operating system 305.

A virtual computing system 306 includes a virtual environment that enables cloud-based execution of operations and/or processes described herein using computing hardware 303. A virtual computing system 306 may execute one or more applications using a file system that includes binary files, software libraries, and/or other resources required to execute applications on a guest operating system (e.g., within the virtual computing system 306) or the host operating system 305.

Although the masking device 301 may include one or more elements 303-306 of the cloud computing system 302, may execute within the cloud computing system 302, and/or may be hosted within the cloud computing system 302, in some implementations, the masking device 301 may not be cloud-based (e.g., may be implemented outside of a cloud computing system) or may be partially cloud-based. For example, the masking device 301 may include one or more devices that are not part of the cloud computing system 302, such as device 400 of FIG. 4, which may include a standalone server or another type of computing device. The masking device 301 may perform one or more operations and/or processes described in more detail elsewhere herein.

Input device 310 may be implemented on a cloud computing system at least partially integrated with cloud computing system 302 (e.g., as computing hardware 303) or distinct from cloud computing system 302 (e.g., as a standalone server). In some implementations, the input device 310 may include one or more devices (e.g., one or more servers) that are not part of a cloud computing system, such as device 400 of FIG. 4, which may include a standalone server or another type of computing device. The input device 310 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The input device 310 may provide an XML file and/or a DOM structure to a masking device for modification and output (e.g., to the data store 340, the user device 350, and/or another computing device), as described elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

Validation device 330 may be implemented on a cloud computing system at least partially integrated with cloud computing system 302 (e.g., as computing hardware 303) or distinct from cloud computing system 302 (e.g., as a standalone server). In some implementations, the validation device 330 may include one or more devices (e.g., one or more servers) that are not part of a cloud computing system, such as device 400 of FIG. 4, which may include a standalone server or another type of computing device. The validation device 330 may include a server, a database server, an application server, a client server, a web server, a host server, a proxy server, a virtual server (e.g., executing on computing hardware), a server in a cloud computing system, a device that includes computing hardware used in a cloud computing environment, or a similar type of device. The validation device 330 may validate sensitive information identified by a masking device before the masking device modifies a DOM structure based on the sensitive information, as described elsewhere herein.

Data store 340 may be implemented on a cloud computing system at least partially integrated with cloud computing system 302 (e.g., as computing hardware 303) or distinct from cloud computing system 302 (e.g., as a standalone server). In some implementations, the data store 340 may include one or more devices (e.g., one or more servers) that are not part of a cloud computing system, such as device 400 of FIG. 4, which may include a standalone server or another type of computing device. The data store 340 may include may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data store 340 may receive an XML file or a DOM structure for storage from a masking device, as described elsewhere herein.

User device 350 may include one or more devices capable of receiving indications associated with remediating of a set of data. The user device 350 may include a communication device. For example, the user device 350 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. The user device 350 may receive output from a masking device, as described elsewhere herein. Additionally, or alternatively, the user device 350 may instruct the input device 310 to provide an XML file and/or a DOM structure to the masking device or may instruct the masking device to retrieve the XML file and/or the DOM structure from the input device 310, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
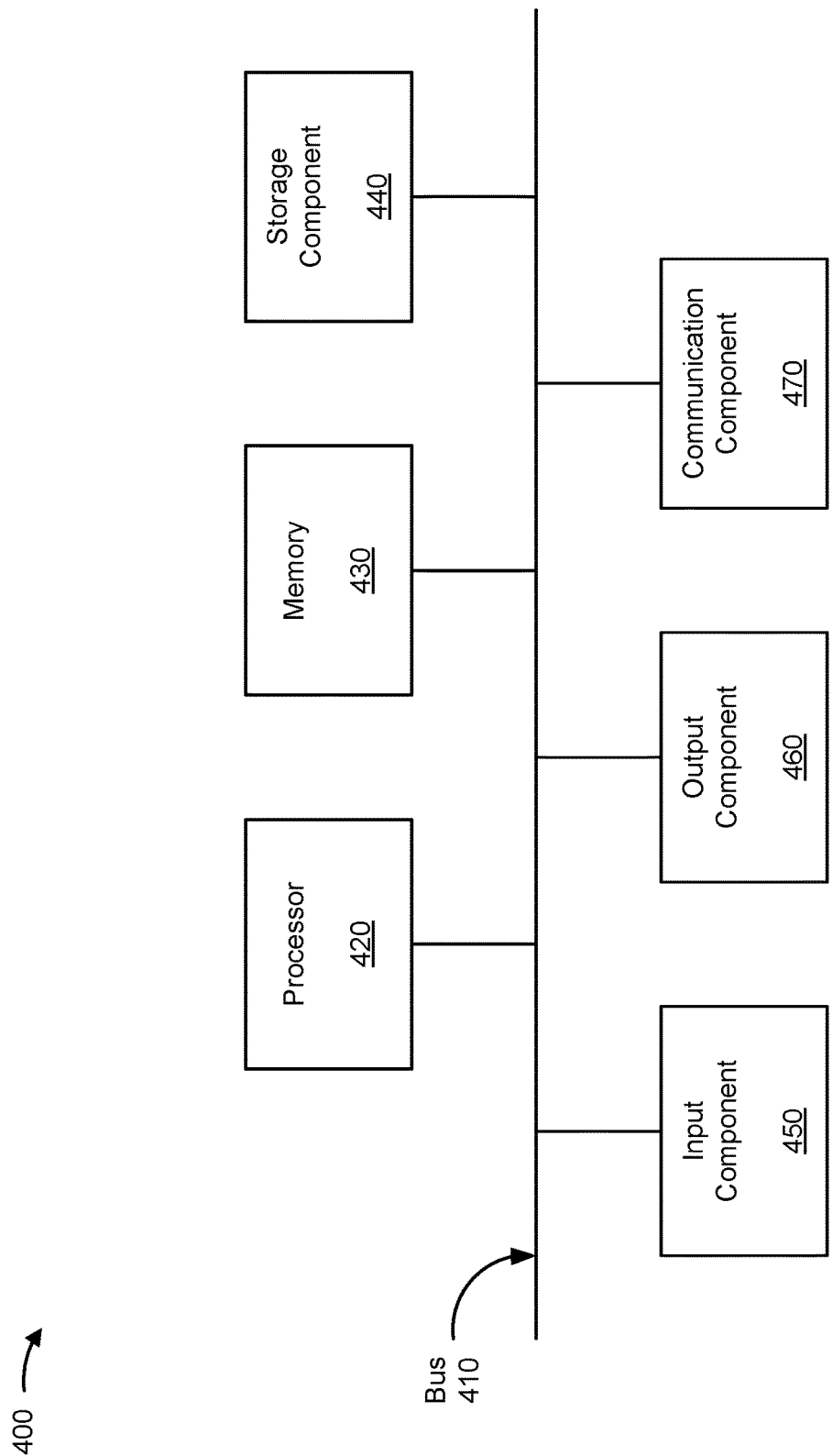
FIG. 4 is a diagram of example components of one or more devices of FIG. 3.

FIG. 4 is a diagram of example components of a device 400, which may correspond to an input device, a data store, and/or a user device. In some implementations, an input device, a data store, and/or a user device may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a RAM, a read-only memory (ROM), and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with fast and flexible remediation of sensitive information using DOM structures. In some implementations, one or more process blocks of FIG. 5 may be performed by a masking device (e.g., masking device 301). In some implementations, one or more process blocks of FIG. 5 may be performed by another device or a group of devices separate from or including the masking device, such as input device 310, validation device 330, data store 340, and/or user device 350. Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving at least one DOM structure including at least one element that is associated with text (block 510). In some implementations, the at least one element may be further associated with an attribute. As further shown in FIG. 5, process 500 may include receiving one or more rules (block 520). Each rule may indicate a corresponding element, a corresponding pattern, and a type of remediation. In some implementations, a rule may further indicate a conditional attribute. As further shown in FIG. 5, process 500 may include traversing the at least one DOM structure to identify one or more elements that map to one or more corresponding elements indicated by the one or more rules (block 530). As further shown in FIG. 5, process 500 may include determining whether one or more attributes associated with the one or more identified elements map to one or more conditional attributes indicated by the one or more rules (block 540). As further shown in FIG. 5, process 500 may include determining whether at least some text, associated with the one or more identified elements, is sensitive information by determining whether the at least some text maps to one or more corresponding patterns indicated by the one or more rules (block 550). The at least some text may be determined as sensitive information when the one or more attributes associated with the one or more identified elements map to the one or more conditional attributes indicated by the one or more rules. As further shown in FIG. 5, process 500 may include performing at least one validation on the sensitive information (block 560). As further shown in FIG. 5, process 500 may include modifying the at least one DOM structure based on the sensitive information, the at least one validation, and one or more types of remediation indicated by the one or more rules (block 570). As further shown in FIG. 5, process 500 may include outputting the at least one modified DOM structure (block 580).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

The foregoing disclosure provides illustration and description but is not intended to be exhaustive or to limit the implementations to the precise forms disclosed. Modifications may be made in light of the above disclosure or may be acquired from practice of the implementations. In particular, any of the various processes described above can be performed in alternative sequences and/or in parallel (on the same or on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. It will be evident to the annotator skilled in the art to freely combine several or all of the embodiments discussed here as deemed suitable for a specific application of the invention. Throughout this disclosure, terms like "advantageous", "exemplary" or "preferred" indicate elements or dimensions which are particularly suitable (but not essential) to the invention or an embodiment thereof, and may be modified wherever deemed suitable by the skilled annotator, except where expressly required. Accordingly, the scope of the invention should be determined not by the embodiments illustrated, but by the appended claims and their equivalents.

What is claimed is:

1. A system for remediating sensitive information within document object model (DOM) structures, the system comprising:
   one or more memories; and
   one or more processors, communicatively coupled to the one or more memories, configured to:
      receive one or more rules, each rule being associated with a respective identifier and each rule indicating a corresponding element, a corresponding pattern, a conditional attribute, and a type of remediation;
      receive at least one DOM structure including at least one element that is associated with text and associated with an attribute;
      determine an order for applying the one or more rules based on the respective identifier associated with each rule;
      determine, based on the order for applying the one or more rules, that the DOM structure is evaluated according to a first rule, of the one or more rules, prior to the DOM structure being evaluated according to a second rule, of the one or more rules, based on an identifier associated with the first rule satisfying a condition with respect to an identifier associated with the second rule;
      for each rule of the one or more rules and in the order determined for the one or more rules:
         traverse the at least one DOM structure to identify one or more elements that map to a corresponding element indicated by the rule;
         determine that an attribute, associated with the one or more elements, maps to a conditional attribute indicated by the rule;
         determine that at least some text, associated with the one or more elements, is sensitive information by determining that the at least some text maps to a corresponding pattern indicated by the rule, based on determining that the attribute, associated with the one or more elements, maps to the conditional attribute indicated by the rule;
         perform at least one validation on the sensitive information, wherein the one or more processors, to perform the at least one validation on the sensitive information, are configured to:

determine that a first portion of the at least some text is a false positive; and
modify the at least one DOM structure based on the sensitive information, the at least one validation, and a type of remediation indicated by the rule, wherein the false positive is not modified when the at least one DOM structure is modified; and
output the at least one modified DOM structure.

2. The system of claim 1, wherein the one or more processors, to receive the at least one DOM structure, are configured to:
receive at least one extensible markup (XML) file; and
generate the at least one DOM structure based on the at least one XML file.

3. The system of claim 1, wherein the one or more processors are further configured to, for each rule of the one or more rules:
identify at least one additional element within a threshold distance of the one or more elements;
determine that at least some text, associated with the at least one additional element, is additional sensitive information based on a determination that the at least some text maps to the corresponding pattern indicated by the rule;
perform at least one validation on the additional sensitive information; and
modify the at least one DOM structure based on the additional sensitive information and the type of remediation indicated by the rule.

4. The system of claim 3, wherein the one or more processors are further configured to, for each rule of the one or more rules:
determine that an additional attribute associated with the at least one additional element maps to the conditional attribute indicated by the rule,
wherein the at least some text is determined to be the additional sensitive information based on a determination that the additional attribute maps to the conditional attribute indicated by the rule.

5. The system of claim 1, wherein the at least one validation includes a length check, a Luhn algorithm check, an exclusions list check, or an identification number check.

6. The system of claim 1, wherein the type of remediation is selected from:
replacement of sensitive information with a stored string;
replacement of one or more digits included in sensitive information;
replacement of one or more characters included in sensitive information;
tokenization of sensitive information;
encryption of sensitive information; or
a combination thereof.

7. The system of claim 1, wherein the one or more processors, to output the at least one modified DOM structure, are configured to:
generate at least one extensible markup (XML) file based on the at least one modified DOM structure; and
output the at least one XML file.

8. A method of remediating sensitive information within document object model (DOM) structures, comprising:
receiving, by a device, one or more rules, each rule being associated with a respective identifier and each rule indicating a corresponding element, a corresponding pattern, a conditional attribute, and a type of remediation;
receiving, by the device, at least one DOM structure including at least one element that is associated with text and associated with an attribute;
determining, by the device, an order for applying the one or more rules based on the respective identifier associated with each rule;
determining, based on the order for applying the one or more rules, that the DOM structure is evaluated according to a first rule, of the one or more rules, prior to the DOM structure being evaluated according to a second rule, of the one or more rules based on an identifier associated with the first rule satisfying a condition with respect to an identifier associated with the second rule;
traversing, based on the order determined for the one or more rules, the at least one DOM structure to identify one or more elements that map to one or more corresponding elements indicated by the one or more rules;
determining, by the device, whether one or more attributes, associated with the one or more identified elements, map to one or more conditional attributes indicated by the one or more rules;
determining, when the one or more attributes associated with the one or more identified elements map to the one or more conditional attributes indicated by the one or more rules, whether at least some text, associated with the one or more identified elements, is sensitive information by determining whether the at least some text maps to one or more corresponding patterns indicated by the one or more rules;
performing, by the device, at least one validation on the sensitive information, wherein performing the at least one validation includes:
determining that a first portion of the at least some text is a false positive;
modifying, by the device, the at least one DOM structure based on the sensitive information, the at least one validation, and one or more types of remediation indicated by the one or more rules,
wherein the false positive is not modified when the at least one DOM structure is modified; and
outputting, by the device, the at least one modified DOM structure.

9. The method of claim 8, further comprising:
determining, by the device, whether the one or more attributes associated with the one or more identified elements are associated with one or more values that map to one or more conditional values associated with the one or more conditional attributes indicated by the one or more rules,
wherein the at least some text is determined to be the sensitive information based on determining that the one or more values map to the one or more conditional values associated with the one or more conditional attributes indicated by the one or more rules.

10. The method of claim 8, wherein the one or more identified elements include a first identified element and one or more second identified elements, and wherein the method further comprises:
extracting a value from the sensitive information associated with the first identified element; and
determining, by the device, that at least some text associated with the one or more second identified elements is additional sensitive information by determining that the at least some text maps to the extracted value,
wherein the at least one DOM structure is modified based on the additional sensitive information.

11. The method of claim 8, wherein the one or more corresponding patterns include at least one regular expression.

12. The method of claim 8, further comprising:
determining, by the device, whether one or more additional attributes, associated with the one or more identified elements, map to one or more corresponding attributes indicated by the one or more rules; and
determining, by the device, whether at least some additional text included in the one or more additional attributes is additional sensitive information by determining whether the at least some additional text maps to one or more additional corresponding patterns indicated by the one or more rules,
wherein the at least one DOM structure is modified based on the additional sensitive information.

13. The method of claim 8, further comprising:
outputting, by the device, at least one response including a summary of modifications associated with the sensitive information, wherein each modification is associated with a rule of the one or more rules that triggered the modification.

14. A non-transitory computer-readable medium storing a set of instructions for remediating sensitive information within document object model (DOM) structures, the set of instructions comprising:
one or more instructions that, when executed by one or more processors of a device, cause the device to:
receive one or more rules, each rule being associated with a respective identifier and each rule indicating a corresponding element, a corresponding pattern, and a type of remediation;
receive at least one DOM structure including at least one element that is associated with text;
determine an order for applying the one or more rules based on the respective identifier associated with each rule;
determine, based on the order for applying the one or more rules, that the DOM structure is evaluated according to a first rule, of the one or more rules, prior to the DOM structure being evaluated according to a second rule, of the one or more rules based on an identifier associated with the first rule satisfying a condition with respect to an identifier associated with the second rule;
traverse, based on the order determined for the one or more rules, the at least one DOM structure to identify one or more elements that map to one or more corresponding elements indicated by the one or more rules;
determine that at least some text, associated with the one or more identified elements, is sensitive information by determining that the at least some text maps to one or more corresponding patterns indicated by the one or more rules;
perform at least one validation on the sensitive information, wherein the one or more instructions, that cause the device to perform the at least one validation, cause the device to:
determine that a first portion of the at least some text is a false positive;
modify the at least one DOM structure based on the sensitive information, the at least one validation, and one or more types of remediation indicated by the one or more rules,
wherein the false positive is not modified when the at least one DOM structure is modified; and
output the at least one modified DOM structure.

15. The non-transitory computer-readable medium of claim 14, wherein the one or more instructions, when executed by the one or more processors, further cause the device to:
determine that at least some additional text, included in one or more attributes associated with the one or more identified elements, is additional sensitive information by determining that the at least some additional text maps to one or more additional corresponding patterns indicated by the one or more rules,
wherein the at least one DOM structure is modified based on the additional sensitive information.

16. The non-transitory computer-readable medium of claim 14, wherein the one or more instructions, that cause the device to modify the at least one DOM structure, cause the device to perform one or more of:
replacement of the sensitive information using a stored string;
replacement of one or more digits, included in the sensitive information, using a stored character;
replacement of one or more characters, included in the sensitive information, using the stored character;
tokenization of the sensitive information; or
encryption of the sensitive information.

17. The non-transitory computer-readable medium of claim 14, wherein the one or more instructions, that cause the device to output the at least one modified DOM structure, cause the device to perform one or more of:
transmit the at least one modified DOM structure to a device;
store the at least one modified DOM structure in a memory;
generate at least one extensible markup (XML) file based on the at least one modified DOM structure and transmit the at least one XML file to the device; or
generate at least one XML file based on the at least one modified DOM structure and store the at least one XML file in the memory.

18. The non-transitory computer-readable medium of claim 14, wherein the one or more rules are included in one or more XML files.

19. The non-transitory computer-readable medium of claim 14, wherein the one or more instructions, when executed by the one or more processors, further cause the device to:
identify one or more additional elements within a threshold distance of at least one of the one or more identified elements;
determine that at least some text, associated with the one or more additional elements, is additional sensitive information by determining that the at least some text maps to at least one of the one or more corresponding patterns;
perform at least one validation on the additional sensitive information; and
modify the at least one DOM structure based on the additional sensitive information and the one or more types of remediation.

20. The non-transitory computer-readable medium of claim 19, wherein the one or more instructions, when executed by the one or more processors, further cause the device to:
determine that an additional attribute associated with the one or more additional elements maps to the conditional attribute indicated by the rule, wherein the at least some text is determined to be the additional sensitive information based on a determination that the additional attribute maps to the conditional attribute indicated by the rule.

\* \* \* \* \*